United States Patent [19]

Contant

[11] 4,275,412
[45] Jun. 23, 1981

[54] TELEVISION CAMERA
[75] Inventor: Cornelis J. Contant, Eindhoven, Netherlands
[73] Assignee: U.S. Philips Corporation, New York, N.Y.
[21] Appl. No.: 65,025
[22] Filed: Aug. 9, 1979
[30] Foreign Application Priority Data
  Oct. 24, 1978 [NL] Netherlands ......................... 7810582
[51] Int. Cl.³ .............................................. H04N 5/64
[52] U.S. Cl. ........................................ 358/55; 358/51; 354/104; 352/67
[58] Field of Search ............... 358/50, 51, 55; 352/67; 354/103, 104
[56] References Cited
  U.S. PATENT DOCUMENTS
  4,057,837  11/1977  Needs ..................................... 358/55

FOREIGN PATENT DOCUMENTS 2744592  4/1978  Fed. Rep. of Germany ............. 358/55
1544120  4/1979  United Kingdom ...................... 358/55

Primary Examiner—Marc E. Bookbinder
Assistant Examiner—Michael A. Masinick
Attorney, Agent, or Firm—Marc D. Schechter

[57] ABSTRACT

The invention relates to a television camera comprising a plurality of pickup elements which are positioned relative to a pickup lens by means of a holder which also includes a color splitting prism system. A front face of the prism system is attached to a reference face of the holder. The prism system is positioned in the holder by means of an abutment element attached to the holder and engaging at least one optically flat prism face. In this manner the prism system is very accurately positioned in the holder in a simple manner.

7 Claims, 4 Drawing Figures

TELEVISION CAMERA

BACKGROUND OF THE INVENTION

The invention relates to a television camera having a plurality of pickup elements positioned relative to a pickup lens by means of a holder which incorporates a color splitting prism system. A front face of the prism system is attached to a reference face of the holder. The prism system is composed of a plurality of prisms which are attached to one another along optically flat prism faces. Optically flat prism faces also form the front face and the end faces for the prism system. Light coming from the pickup lens can enter the prism system via the front face and light intended for the pick-up elements can leave the prism system via the end faces.

British patent specification No. 1,544,120 discloses a television camera of the type described above, wherein the holder is provided with spaces in which the pickup lens and the pick-up tubes are to be mounted and which are rigidly disposed with respect to one another. The color splitting prism system is mounted in a separate space in the holder against the reference face. A flange, which is connected to a bush accommodating a pickup lens, is clamped between the front face of the prism system and the abutment face of the holder.

To ensure proper operation of a television camera of the type described above, the pickup lens, the color splitting prism system and the pickup elements must be positioned very accurately relative to each other. A light beam originating from an object to be recorded, which emerges from the pickup lens along the optical axis thereof, is split by the prism system into a plurality of light beams directed towards the pickup tubes. The object to be recorded must form a sharp picture on the target plate of each pickup tube. For that purpose, the color splitting prism system must be mounted in the known camera, in which the pick-up lens and the pickup tubes are mounted in spaces which have been rigidly arranged relative to one another, with a high degree of accuracy in the holder against the abutment face.

SUMMARY OF THE INVENTION

It is an object of the invention to provide a television camera in which the color splitting prism system is positioned very accurately in the holder in a simple manner. A television camera according to the invention is therefore characterized in that the prism system is positioned in the holder by means of an abutment element, attached to the holder, which engages at least one optically flat prism face in a number of points along a contact line which is at least substantially parallel with the front face. The prism system can be disposed in the holder in a simple manner: the front face bearing on the reference face and another prism face bearing against the abutment element. After mounting, the position of the prism system in the holder is defined by the front face and the line of contact through the points located on the other prism face. This position is very accurately defined, as the front face as well as the other prism face are optically flat, and so very accurately defined, and as the mutual positions of these optically flat prism faces, which are determined by the angles between them, these angles being determined with optical accuracy, are also very accurately defined.

A television camera according to the invention, wherein the color splitting prism system is positioned in the holder with an additional degree of accuracy is characterized in that the abutment element engages a prism face which is connected to the face of a second prism. As the abutment element actually engages the two interconnected optically flat prism faces, tolerances in the dimensions of the individual prisms, as a result of a certain averaging of errors, will only be apparent to a very low extent as errors in the positioning of the prisms in the holder. Preferably, the face which the abutment element engages forms part of the prism which includes the front face of the prism system. Consequently, the prism is positioned as accurately as possible, which is of great importance because light intended for all pickup tubes travels through this prism.

A further preferred embodiment of the television camera according to the invention is characterized in that the abutment element also engages the prism face by means of which the second prism is connected to a third prism. The spatial positions of the first and the second prisms in the holder are defined because one line and one face of the two prisms are defined. Of the first prism the front face and a line in the interface with the second prism is defined. Of the second prism the interface with the first prism and a line in the interface with the third prism is now defined. This furnishes a particularly accurate positioning of the prism system in the holder.

BRIEF DESCRIPTION OF THE DRAWINGS

The invention will now be further explained by way of examples with reference to the drawing.

DESCRIPTION OF THE PREFERRED EMBODIMENTS

Figure 1:
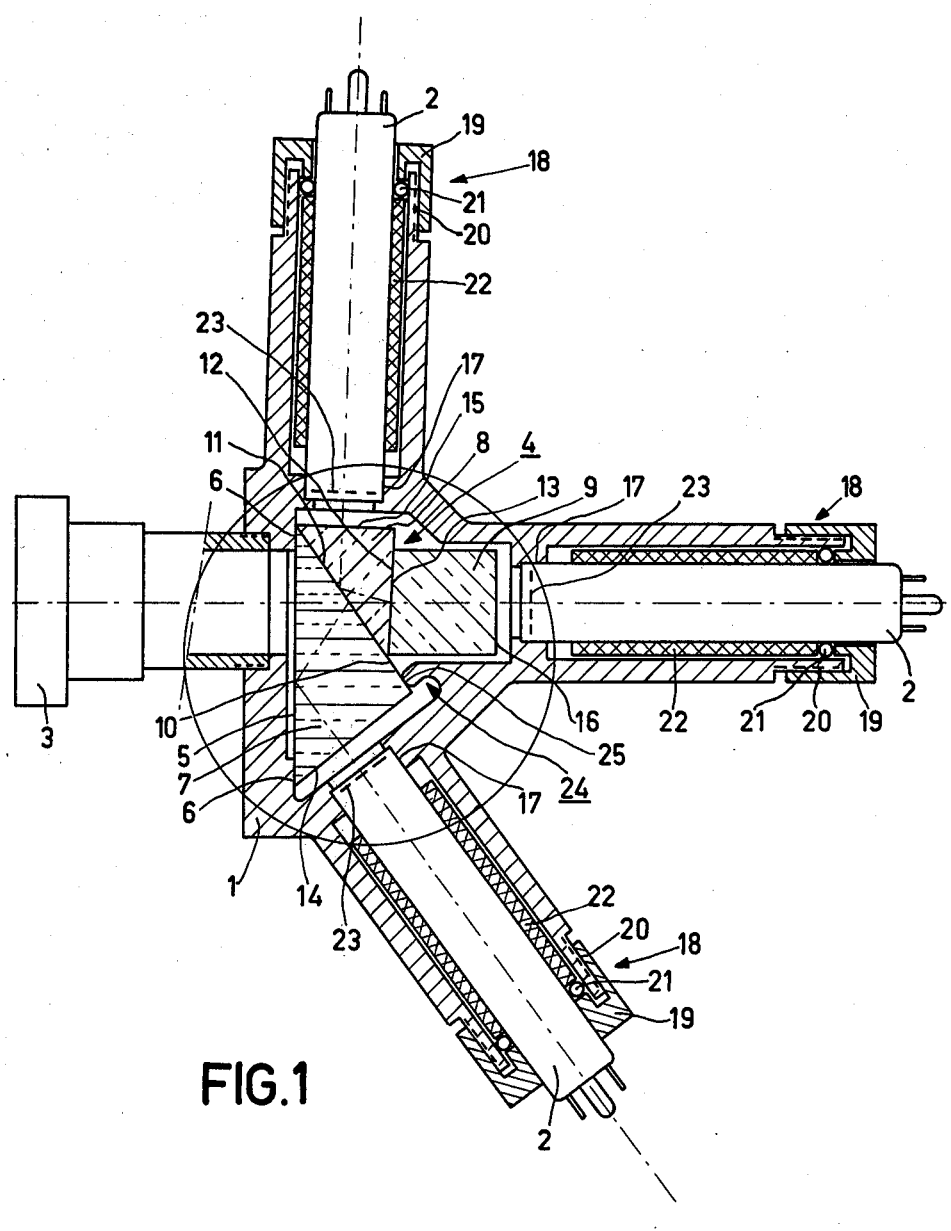
FIG. 1 shows schematically a cross-section of a relevant portion of a television camera according to the invention.
Figure 2:
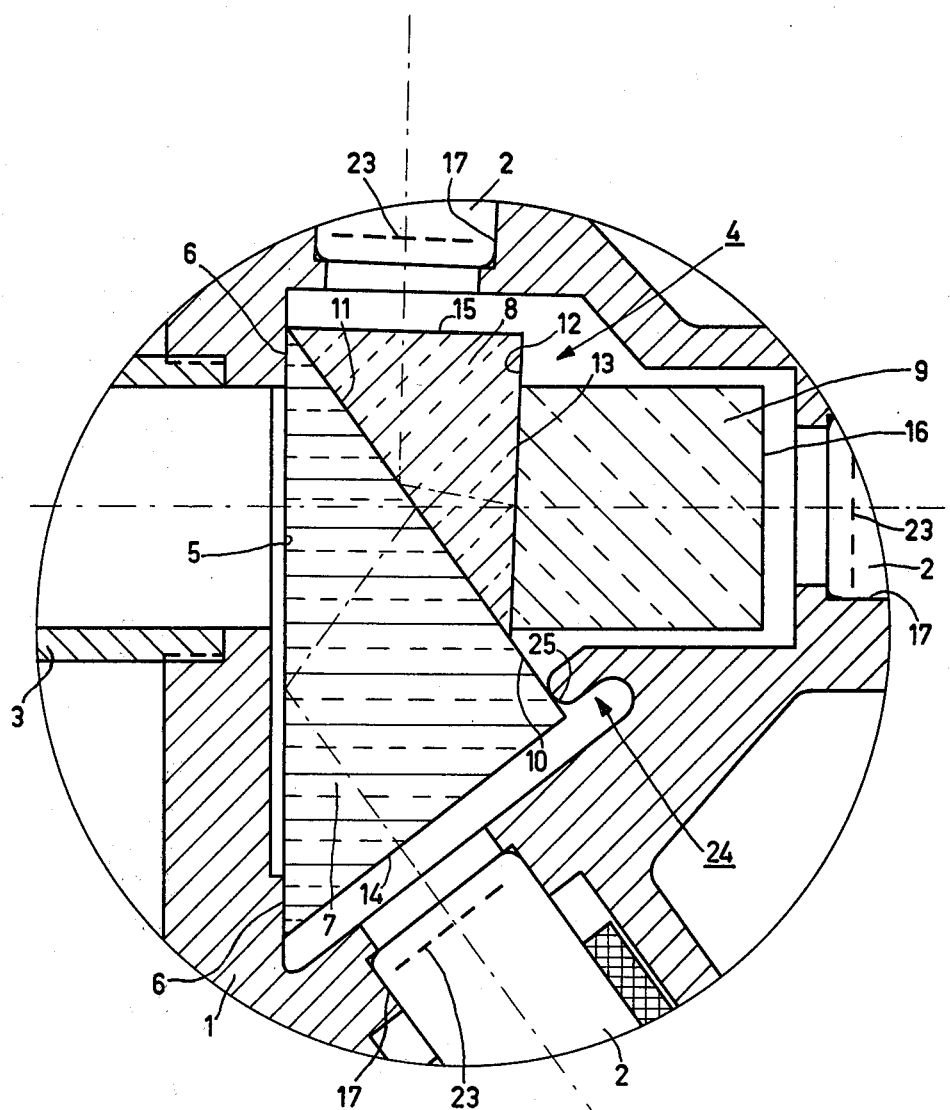
FIG. 2 shows the encircled portion in FIG. 1 at an enlarged scale.

FIG. 1, and FIG. 2 on an enlarged scale, show a portion of a television camera comprising a holder 1 wherein three pick-up elements, here pick-up tubes 2, are positioned with respect to a pickup lens 3. The holder 1 comprises a color splitting prism system 4 which is cemented along a front face 5 to a reference face 6 of the holder 1. The color splitting prism system 4 is composed of three prisms 7, 8 and 9, which are fastened together along optically flat prism faces 10, 11 and 12, 13 respectively. Light from the pickup lens 3 can pass into the prism system 4 through the front face 5 whereas light intended for the pickup tubes 2 can emerge from the prism system through optically flat end faces 14, 15 and 16. For each pickup tube 2 the holder 1 is provided with a ring-shaped seat 17. The pickup tubes 2 are pushed onto slots 17 by means of springfitted pressure elements 18, with a pressure pieces 19 which can be fitted on the holder 1 by means of screwthreads 20. Pressure is exerted by means of springfitted O-rings 21 bearing on a coil units 22 connected to the pickup tubes.

A light beam derived from an object to be recorded and emerging from the pickup lens 3 is split by the prism system 4 into three beams directed towards the pickup tubes 2. The object is focussed on the schematicallly shown target plates 23 of the pickup tubes 2. The very accurate positioning of the prism system 4 in the holder 1 is realised in a simple manner by means of an abutment element 24 attached to the holder 1. The abutment element 24 engages the optically flat prism face 10 along a contact line 25, which is directed at least substantially parallel to the front face 5 (and transverse to the plane of the drawing). It would alternatively be possible for the abutment element 24 to engage one of the optically flat end faces such as 14 or 15. However, engaging the prism face 10 or possibly, also the prism face 12, is preferred as then the abutment element actually engages two optically flat prism faces 10, 11 and 12, 13 respectively, which are fastened together. As a consequence tolerances in the dimensions of the individual prisms affect the positioning of the prisms 7, 8 and 9 in the holder 1 to only a slight degree, as dimensional errors are averaged to a certain extent. The abutment element 24 engages the prism 7, which also includes the front face 5 of the prism system, so that the position of prism 7 is not affected by tolerances in the dimensions of other prisms and so that the positioning of prism 7 is as accurate as possible. This is of great importance because light intended for all pickup tubes 2 passes through prism 7.

Figure 3:
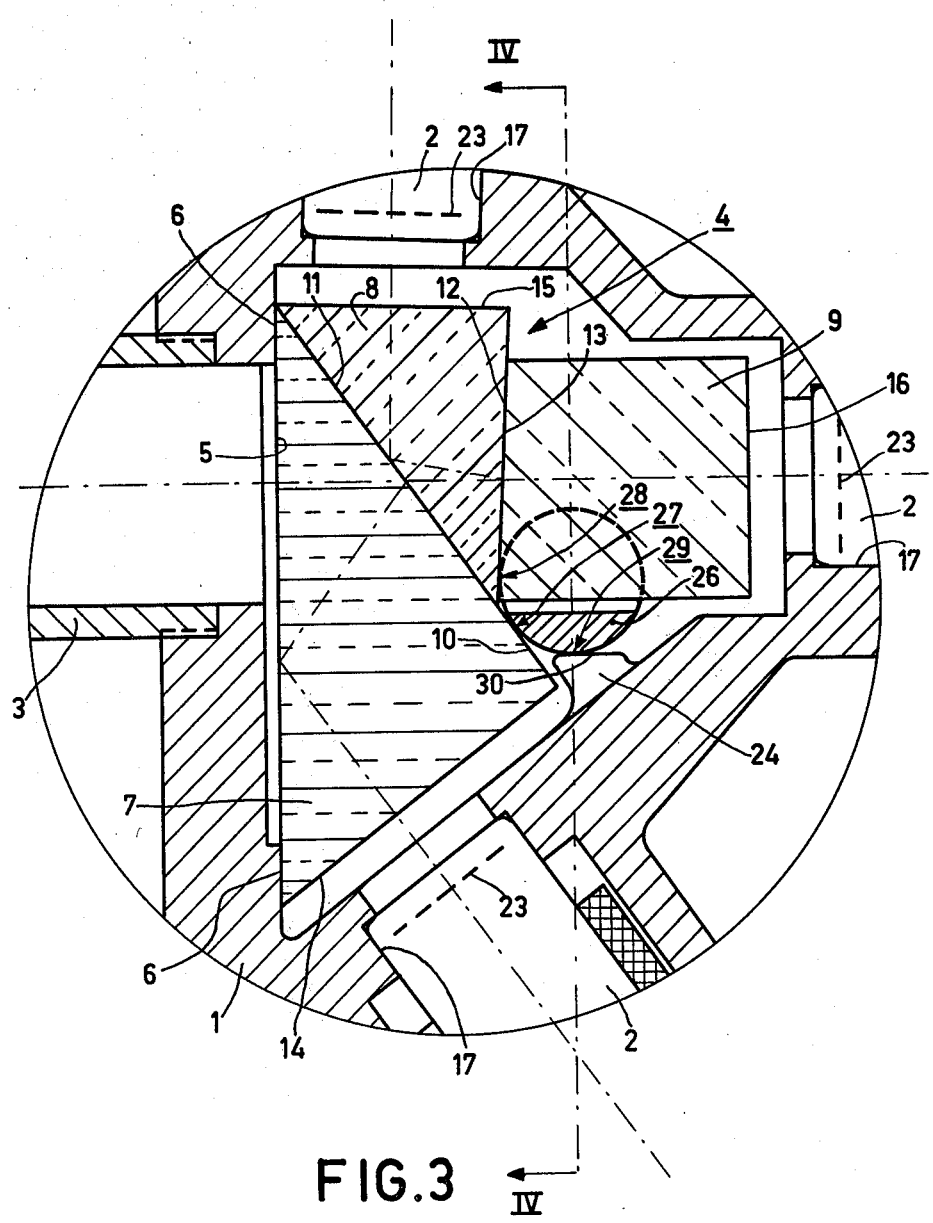
FIG. 3 shows the portion shown in FIG. 2 in a different embodiment of the television camera according to the invention.
Figure 4:
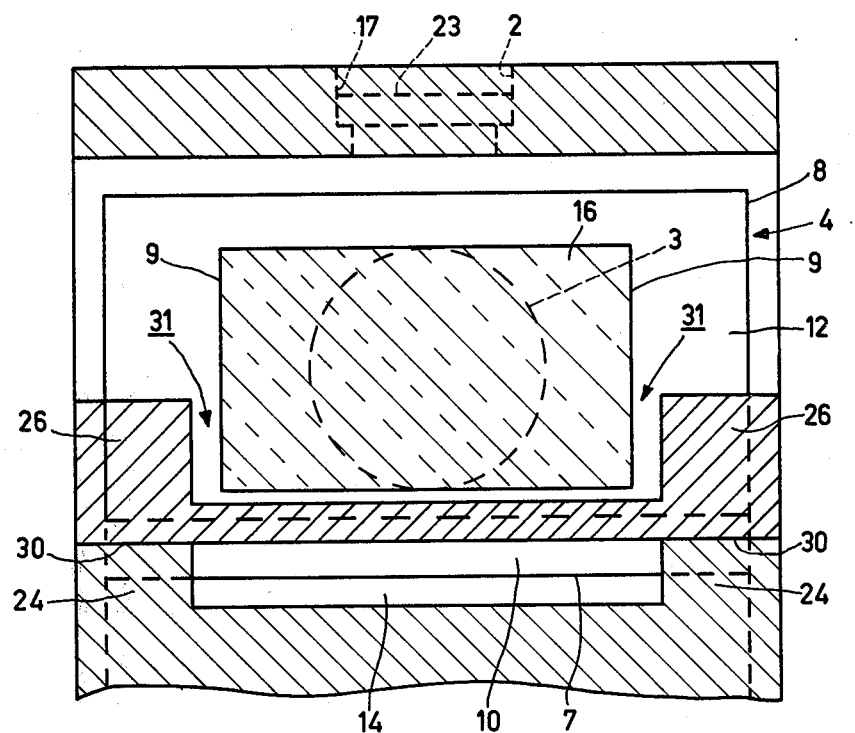
FIG. 4 shows a cross-section along the line IV—IV of the embodiment shown in FIG. 3 of the television camera according to the invention.

FIGS. 3 and 4 show another embodiment of a television camera according to the invention, wherein corresponding components are given the same reference numerals as in FIGS. 1 and 2. The abutment element 24 attached to the holder 1 engages the color splitting prism system 4 by means of a cylindrical portion 26, which engages the prism face 10 along a line 27, the prism face 12 along a line 28 and an abutment face 30 of the abutment element 24 along a line 29. The lines 27, 28 and 29 are parallel to the front face 5 of the prism system 4 and are perpendicular to the plane of the drawing of FIG. 3. The cylindrical portion 26, which has a recess 31 for the prism 9, is rigidly fixed to the prism system 4. After the prism system 4 is attached to the reference face 6 of the holder 1 by means of its front face 5, the cylindrical portion 26 then bearing against the abutment face 30 of the abutment element 24 along the line 29, the spatial position of the prism 7 in the holder 1 is defined because the face 5, which is attached to the reference face 6 of the holder 1, and the line 27 of the prism face 10 are defined. The spatial position of the prism 8 is now also defined in the holder 1 as the face 11, which is attached to the prism face 10 of the prism 7, and the line 28 of the prism face 12 are defined. This results in a very accurate positioning of the prism system 4 in the holder 1.

What is claimed is:

1. A television camera comprising a plurality of pickup elements positioned relative to a pickup lens by means of a holder, said holder having a reference face, further comprising a color splitting prism system, a front face of which is attached to the reference face of the holder, said prism system comprising a plurality of prisms which are attached to one another along optically flat prism faces and which have optically flat prism faces forming end faces and the front face for the prism system, light from the pickup lens entering the prism system through the front face and leaving the prism system through the end faces, CHARACTERIZED IN THAT the prism system is positioned in the holder by means of an abutment element attached to the holder, said abutment element engaging at least one optically flat prism face of a first prism at a number of points along a contact line which is at least substantially parallel to the front face.

2. A television camera comprising a plurality of pickup elements positioned relative to a pickup lens by means of a holder, said holder having a reference face, further comprising a color splitting prism system, a front face of which is attached to the reference face of the holder, said prism system comprising a plurality of prisms which are attached to one another along optically flat prism faces and which have optically flat prism faces forming end faces and the front face for the prism system, light from the pickup lens entering the prism system through the front face and leaving the prism system through the end faces, CHARACTERIZED IN THAT the prism system is positioned in the holder by means of an abutment element attached to the holder, said abutment element engaging at least one optically flat prism face of a first prism at a number of points along a contact line which is at least substantially parallel to the front face, wherein the optically flat prism face engaged by the abutment element is also attached to a prism face of a second prism of the prism system.

3. A television camera, as claimed in claim 2, CHARACTERIZED IN THAT the front face of the prism system is a face of the first prism other than the face engaged by the abutment element.

4. A television camera, as claimed in claim 3, CHARACTERIZED IN THAT the abutment element also engages a face of the second prism, said second prism face being attached to a face of a third prism.

5. A televison camera, as claimed in claim 4, CHARACTERIZED IN THAT the abutment element engages the prism system by means of a cylindrical portion which engages the faces of both the first and second prisms.

6. A television camera, as claimed in claim 5, CHARACTERIZED IN THAT the cylindrical portion is attached to the prism system in a rigid manner.

7. A televison camera comprising a plurality of pickup elements positioned relative to a pickup lens by means of a holder, said holder having a reference face, further comprising a color splitting prism system, a front face of which is attached to the reference face of the holder, said prism system comprising at least a first prism CHARACTERIZED IN THAT the first prism is positioned in the holder by means of an abutment element attached to the holder, said abutment element engaging at least one optically flat prism face of the first prism at a number of points along a contact line which is at least substantially parallel to the front face.

* * * * *